(12) United States Patent
Kwon et al.

(10) Patent No.: US 7,139,043 B2
(45) Date of Patent: Nov. 21, 2006

(54) THIN FILM TRANSISTOR ARRAY PANEL

(75) Inventors: Een-Mi Kwon, Suwon-si (KR); Ae Shin, Cheongju-si (KR); Seung-Soo Baek, Seoul (KR); Young-Mi Tak, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 216 days.

(21) Appl. No.: 10/961,240

(22) Filed: Oct. 7, 2004

(65) Prior Publication Data

US 2005/0128415 A1 Jun. 16, 2005

(30) Foreign Application Priority Data

Oct. 8, 2003 (KR) .................. 10-2003-0069937

(51) Int. Cl.
*G02F 1/1343* (2006.01)
(52) U.S. Cl. .................. 349/39; 349/141; 349/145
(58) Field of Classification Search .................. 349/39, 349/141, 145
See application file for complete search history.

(56) References Cited

U.S. PATENT DOCUMENTS

| | | | |
|---|---|---|---|
| 6,972,824 B1 * | 12/2005 | Masutani et al. ........... 349/192 |
| 6,982,776 B1 * | 1/2006 | Nagano et al. ............. 349/141 |
| 7,006,189 B1 * | 2/2006 | Kim et al. .................. 349/141 |
| 2002/0057411 A1 * | 5/2002 | Kim et al. .................. 349/141 |
| 2003/0086045 A1 * | 5/2003 | Ono et al. .................. 349/141 |
| 2003/0133068 A1 * | 7/2003 | Suzuki et al. ............... 349/141 |
| 2004/0189922 A1 * | 9/2004 | Ono et al. .................. 349/141 |
| 2004/0212770 A1 * | 10/2004 | Lee ........................... 349/141 |
| 2004/0263755 A1 * | 12/2004 | Kim et al. .................. 349/141 |
| 2005/0264743 A1 * | 12/2005 | Suzuki et al. ............... 349/141 |
| 2005/0280748 A1 * | 12/2005 | Ochiai et al. ................. 349/43 |

* cited by examiner

*Primary Examiner*—James A. Dudek
(74) *Attorney, Agent, or Firm*—MacPherson Kwok Chen & Heid LLP

(57) ABSTRACT

A thin film transistor array panel is provided, which includes: a substrate; a gate line formed on the substrate; first and second storage electrodes formed on the substrate and disposed opposite each other with respect to the gate line; a gate insulating layer formed in the gate line and the first and the second storage electrodes; a curved data line formed on the gate insulating layer; a thin film transistor connected to the gate line and the data line; a passivation layer formed on the data line and the thin film transistor; a pixel electrode formed on the passivation layer, connected to the thin film transistor, and having an obtuse corner and an acute corner; and an overpass cross over the gate line and connected to the first and the second storage electrodes.

13 Claims, 16 Drawing Sheets

US 7,139,043 B2

THIN FILM TRANSISTOR ARRAY PANEL

BACKGROUND OF THE INVENTION (a) Field of the Invention

The present invention relates to a thin film transistor array panel.

(b) Description of Related Art

A liquid crystal display (LCD) is one of the most widely used flat panel displays. An LCD includes two panels provided with field-generating electrodes such as pixel electrodes and a common electrode and a liquid crystal (LC) layer interposed therebetween. The LCD displays images by applying voltages to the field-generating electrodes to generate an electric field in the LC layer, which determines orientations of LC molecules in the LC layer to adjust polarization of incident light.

Among the LCDs, a vertical alignment (VA) mode LCD, which aligns LC molecules such that the long axes of the LC molecules are perpendicular to the panels in absence of electric field, is spotlighted because of its high contrast ratio and wide reference viewing angle that is defined as a viewing angle making the contrast ratio equal to 1:10 or as a limit angle for the inversion in luminance between the grays.

The wide viewing angle of the VA mode LCD can be realized by cutouts in the field-generating electrodes and protrusions on the field-generating electrodes. Since the cutouts and the protrusions can determine the tilt directions of the LC molecules, the tilt directions can be distributed into several directions by using the cutouts and the protrusions such that the reference viewing angle is widened.

However, the VA mode LCD has relatively poor lateral visibility compared with front visibility. For example, a patterned VA (PVA) mode LCD having the cutouts shows an image that becomes bright as it goes far from the front, and in the worse case, the luminance difference between high grays vanishes such that the images cannot be perceived.

In addition, the cutouts and the protrusions reduce the aperture ratio. In order to increase the aperture ratio, the size of the pixel electrodes is suggested to be maximized. However, the close distance between the pixel electrodes causes strong lateral electric fields between the pixel electrodes, which dishevels orientations of the LC molecules to yield textures and light leakage, thereby deteriorating display characteristic.

SUMMARY OF THE INVENTION

A thin film transistor array panel is provided, which includes: a substrate; a gate line formed on the substrate; first and second storage electrodes formed on the substrate and disposed opposite each other with respect to the gate line; a gate insulating layer formed in the gate line and the first and the second storage electrodes; a curved data line formed on the gate insulating layer; a thin film transistor connected to the gate line and the data line; a passivation layer formed on the data line and the thin film transistor; a pixel electrode formed on the passivation layer, connected to the thin film transistor, and having an obtuse corner and an acute corner; and an overpass cross over the gate line and connected to the first and the second storage electrodes.

The pixel electrode may include the same layer as the overpass.

The overpass may be disposed near the acute corner and the acute corner of the pixel electrode may be chamfered.

The pixel electrode may have a first major edge and a second major edge shorter than the first major edge and the first and the second major edges may approach near the acute corner.

The acute corner of the pixel electrode may include a first minor edge perpendicular to the first major edge and a second minor edge oblique to the first major edge.

The first minor edge may be shorter than the second minor edge.

The first minor edge and the second minor edge may be connected to each other to make a concave vertex.

The overpass may have first and second edges substantially parallel to the first and the second minor edges, respectively.

The pixel electrode may have a cutout.

The first major edge of the pixel electrode may be substantially parallel to the data line.

The data line may overlap the pixel electrode and the passivation layer may include organic insulator.

The overpass may be disposed near the obtuse corner of the pixel electrode.

BRIEF DESCRIPTION OF THE DRAWINGS

The present invention will become more apparent by describing embodiments thereof in detail with reference to the accompanying drawings in which.

DETAILED DESCRIPTION OF EMBODIMENTS

Figure 1:
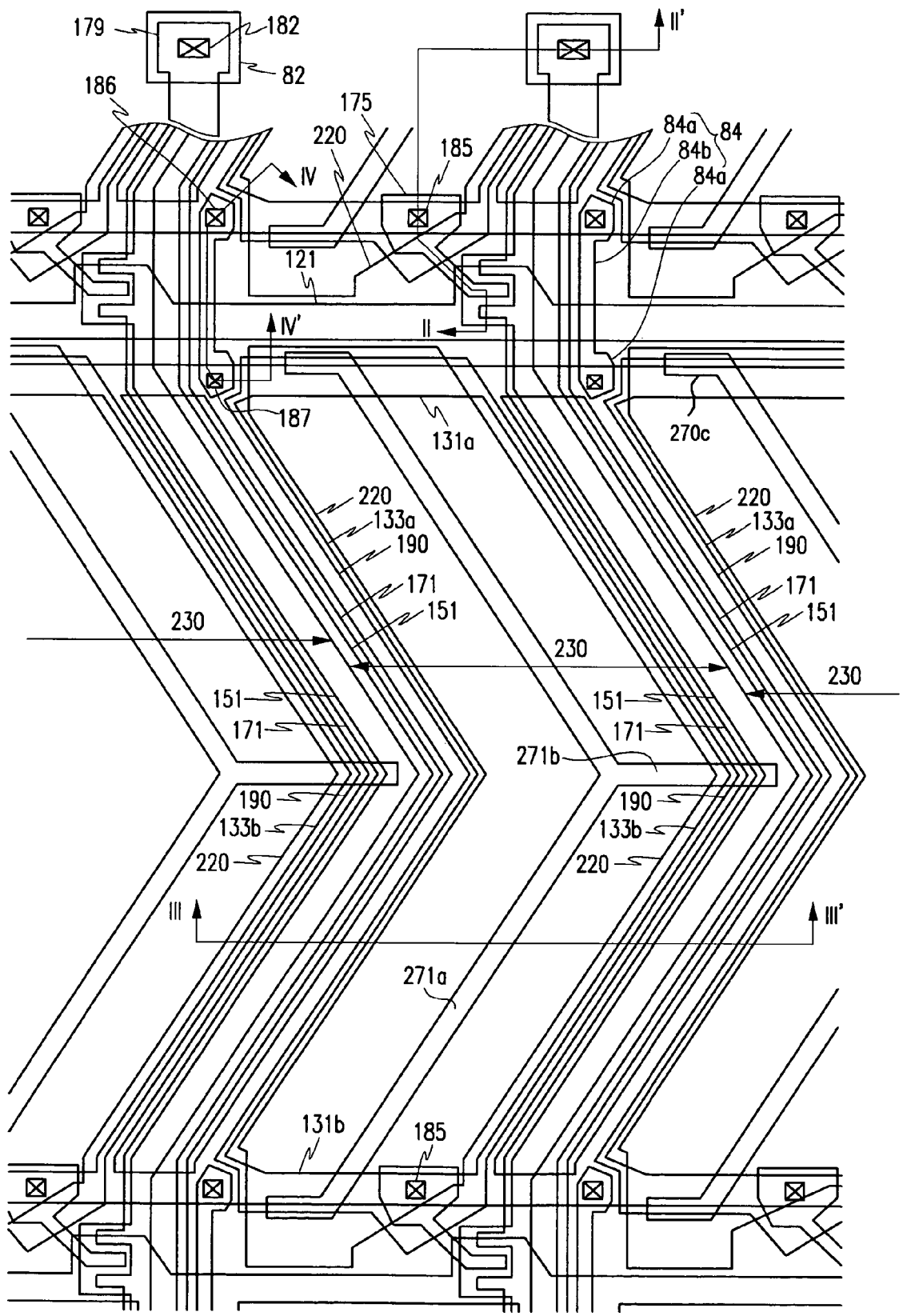
FIG. 1 is a layout view of an LCD according to an embodiment of the present invention.

The present invention now will be described more fully hereinafter with reference to the accompanying drawings, in which preferred embodiments of the invention are shown. The present invention may, however, be embodied in many different forms and should not be construed as limited to the embodiments set forth herein.

In the drawings, the thickness of layers, films and regions are exaggerated for clarity. Like numerals refer to like elements throughout. It will be understood that when an element such as a layer, film, region or substrate is referred to as being "on" another element, it can be directly on the other element or intervening elements may also be present. In contrast, when an element is referred to as being "directly on" another element, there are no intervening elements present.

Now, liquid crystal displays according to embodiments of the present invention will be described with reference to the accompanying drawings.

An LCD according to an embodiment of the present invention is described in detail with reference to FIGS. 1–6.

Figure 2:
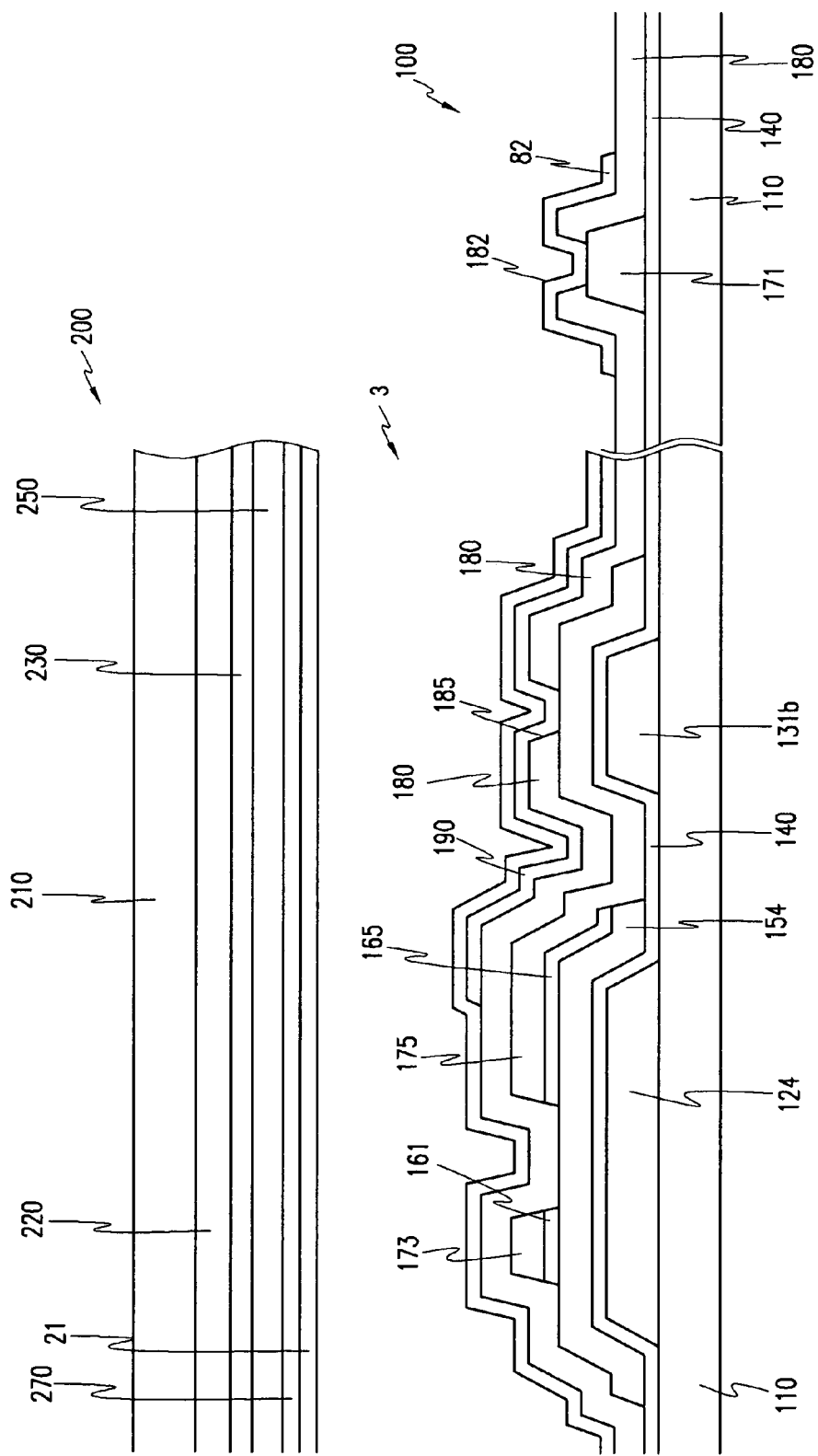
FIGS. 2, 3 and 4 are sectional views of the LCD shown in FIG. 1 taken along the lines II–II', III–III', and IV–IV', respectively.
Figure 3:
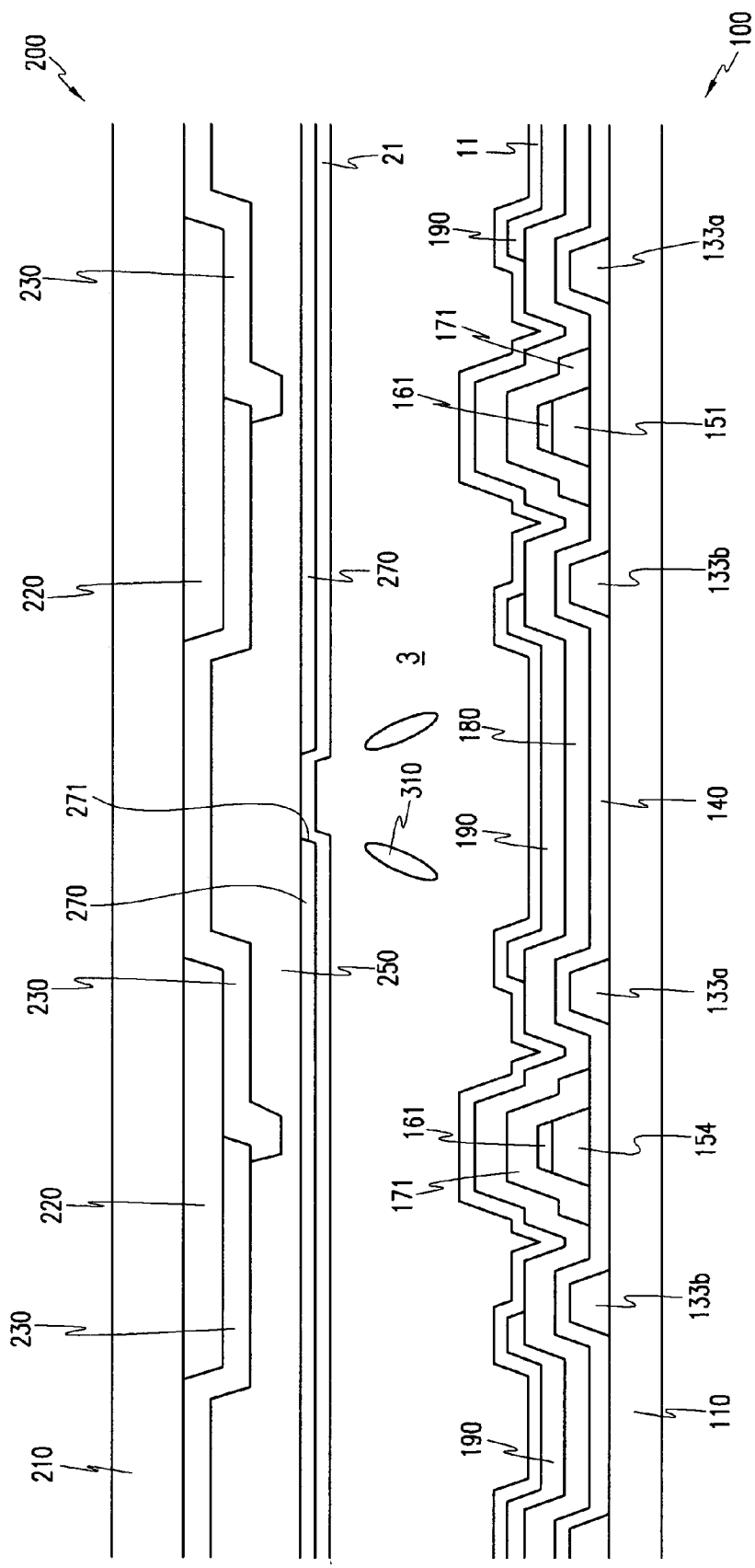
Figure 4:
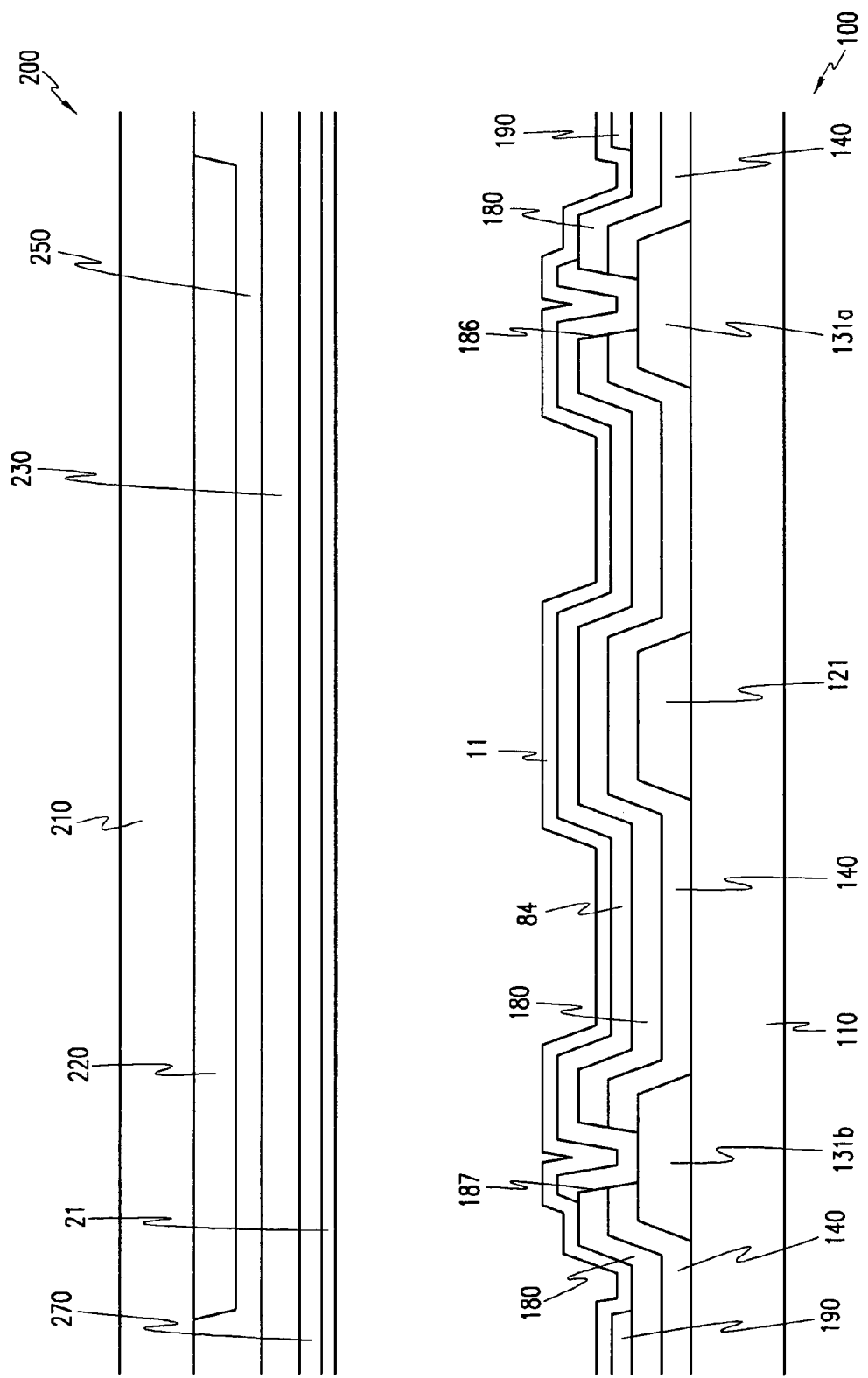
Figure 5:
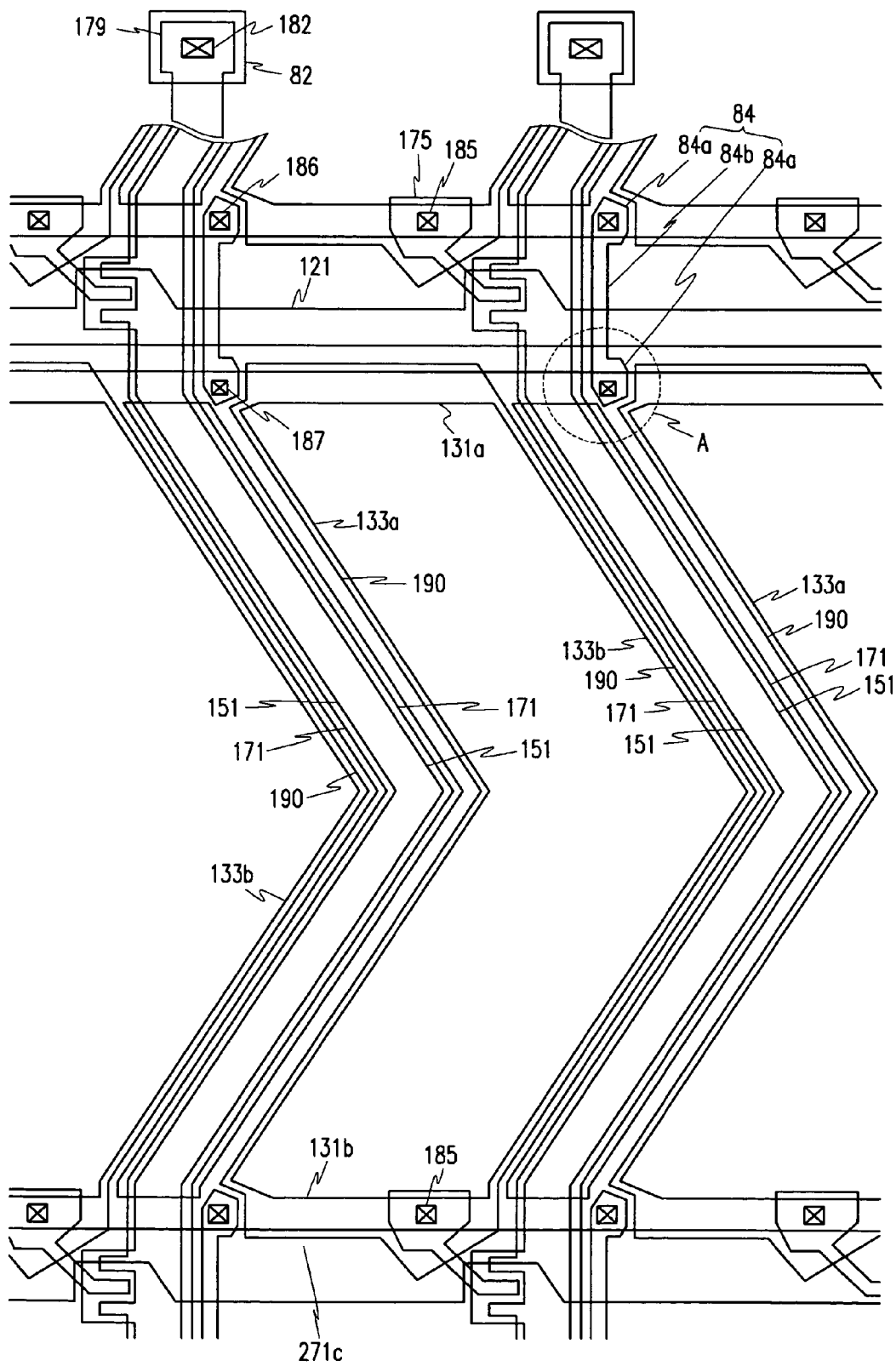
FIG. 5 is a layout view of a TFT array panel of the LCD shown in FIGS. 1–4.
Figure 6:
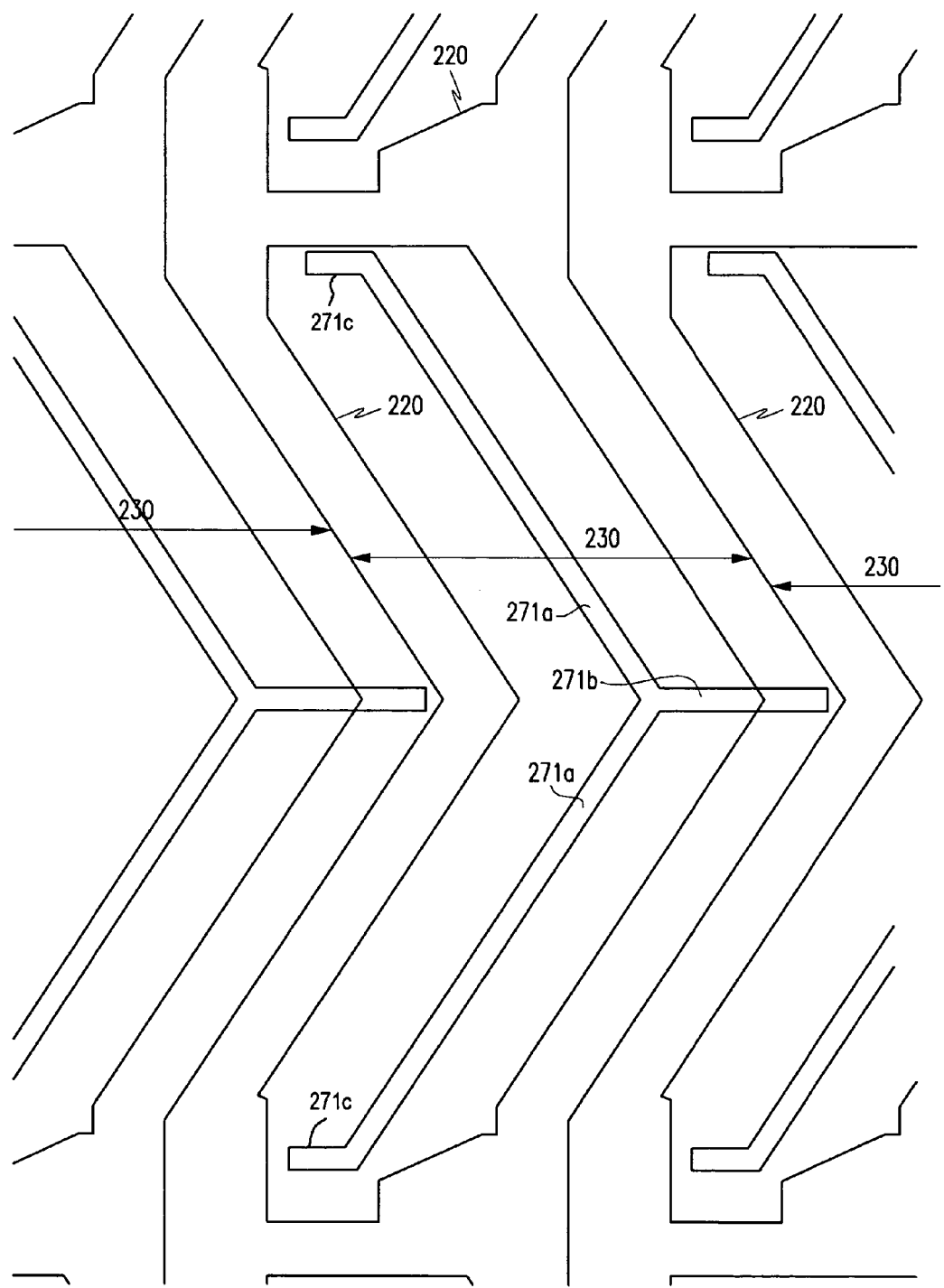
FIG. 6 is a layout view of a common electrode panel of the LCD shown in FIGS. 1–4.
Figure 7:
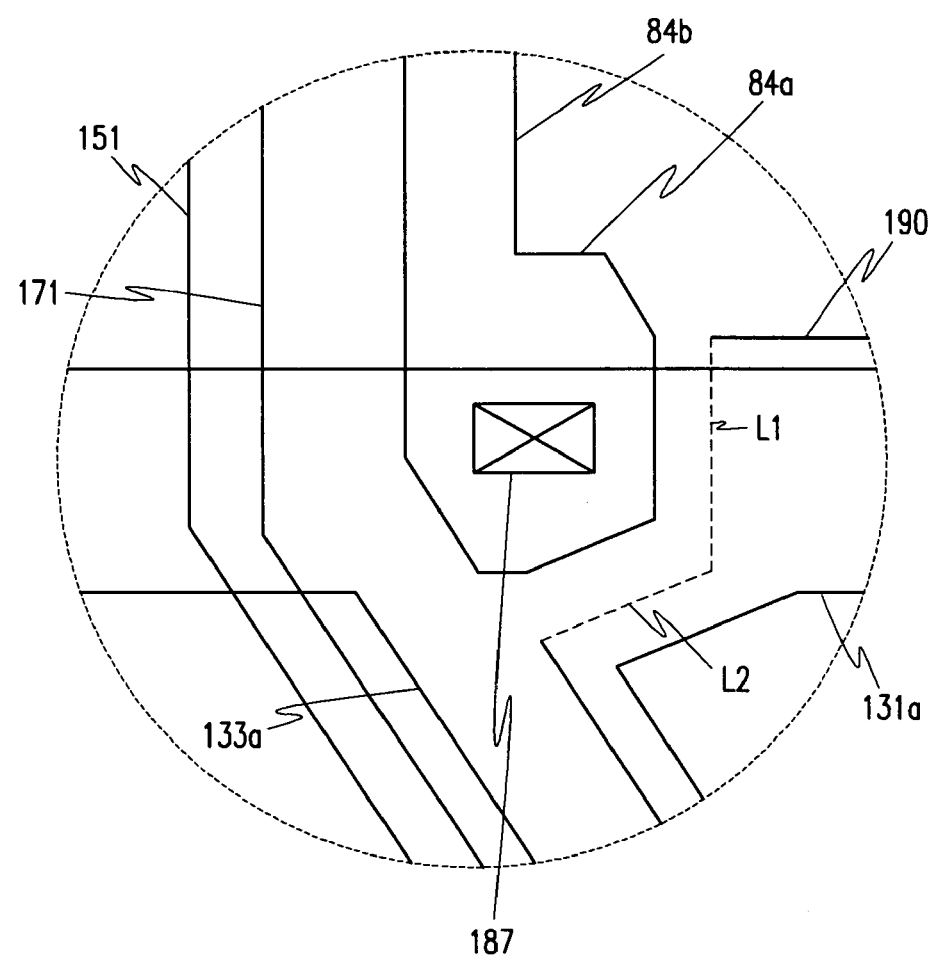
FIG. 7 is an expanded view of a portion of the TFT array panel shown in FIG. 5, which is enclosed by a circle A.

FIG. 1 is a layout view of an LCD according to an embodiment of the present invention, FIGS. 2, 3 and 4 are sectional views of the LCD shown in FIG. 1 taken along the lines II–II', III–III', and IV–IV', respectively, FIG. 5 is a layout view of a TFT array panel of the LCD shown in FIGS. 1–4, and FIG. 6 is a layout view of a common electrode panel of the LCD shown in FIGS. 1–4. FIG. 7 is an expanded view of a portion of the TFT array panel shown in FIG. 5, which is enclosed by a circle A.

An LCD according to an embodiment of the present invention includes a TFT array panel 100, a common electrode panel 200 facing the TFT array panel 100, and a LC layer 3 interposed between the TFT array panel 100 and the common electrode panel 200 and containing a plurality of LC molecules 310.

The TFT array panel 100 is now described in detail with reference to FIGS. 1–5.

A plurality of gate lines 121 and a plurality of pairs of storage electrode lines 131a and 131b are formed on an insulating substrate 110.

The gate lines 121 for transmitting gate signals extend substantially in a transverse direction and are separated from each other. Each gate line 121 includes a plurality of projections forming a plurality of gate electrodes 124. The gate lines 121 may extend to be connected to a driving circuit (not shown) integrated on the substrate 110, or it may have an end portion (not shown) having a large area for connection with another layer or an external driving circuit mounted on the substrate 110 or on another device such as a flexible printed circuit film (not shown) that may be attached to the substrate 110.

The storage electrode lines 131a and 131b extend substantially in the transverse direction, but they are curved near the gate electrodes 124. Each pair of the storage electrode lines 131a and 131b include a plurality of pairs of storage electrodes 133a and 133b that are connected thereto and extend parallel to each other. Each storage electrode 133a or 133b is once curved with a substantially right angle such that it includes a pair of oblique portions making an angle of about 45 degrees with the gate lines 121 and connected to each other with a substantially right angle. The storage electrode lines 131a and 131b are supplied with a predetermined voltage such as a common voltage, which is applied to a common electrode 270 on the common electrode panel 200 of the LCD.

The gate lines 121 and the storage electrode lines 131a and 131b are preferably made of Al containing metal such as Al and Al alloy, Ag containing metal such as Ag and Ag alloy, Cu containing metal such as Cu and Cu alloy, Mo containing metal such as Mo and Mo alloy, Cr, Ta, or Ti. However, they may have a multi-layered structure including two films having different physical characteristics. One of the two films is preferably made of low resistivity metal including Al containing metal, Ag containing metal, or Cu containing metal for reducing signal delay or voltage drop in the gate lines 121 and the storage electrode lines 131a and 131b. On the other hand, the other film is preferably made of material such as Cr, Mo, Mo alloy, Ta, or Ti, which has good physical, chemical, and electrical contact characteristics with other materials such as indium tin oxide (ITO) or indium zinc oxide (IZO). Good examples of the combination of the two films are a lower Cr film and an upper Al—Nd alloy film and a lower Al film and an upper Mo film. The gate lines 121 and the storage electrode lines 131 may have a triple-layered structure including a lower Mo film, an intermediate Al film, and an upper Mo film.

In addition, the lateral sides of the gate lines 121 and the storage electrode lines 131a and 131b are inclined relative to a surface of the substrate 110, and the inclination angle thereof ranges about 30–80 degrees.

A gate insulating layer 140 preferably made of silicon nitride (SiNx) is formed on the gate lines 121 and the storage electrode lines 131a and 131b.

A plurality of semiconductor stripes 151 preferably made of hydrogenated amorphous silicon (abbreviated as "a-Si") or polysilicon are formed on the gate insulating layer 140. Each semiconductor stripe 151 extends substantially parallel to the storage electrodes 133a and 133b such that it is curved periodically. Each semiconductor stripe 151 has a plurality of projections 154 branched out toward the gate electrodes 124.

A plurality of ohmic contact stripes and islands 161 and 165 preferably made of silicide or n+ hydrogenated a-Si heavily doped with n type impurity are formed on the semiconductor stripes 151. Each ohmic contact stripe 161 has a plurality of projections 163, and the projections 163 and the ohmic contact islands 165 are located in pairs on the projections 154 of the semiconductor stripes 151.

The lateral sides of the semiconductor stripes 151 and the ohmic contacts 161 and 165 are inclined relative to the surface of the substrate 110, and the inclination angles thereof are preferably in a range of about 30–80 degrees.

A plurality of data lines 171 and a plurality of drain electrodes 175 separated from each other are formed on the ohmic contacts 161 and 165 and the gate insulating layer 140.

The data lines 171 for transmitting data voltages extend substantially in the longitudinal direction and intersect the gate lines 121 and the storage electrode lines 131a and 131b. Each data line 171 has an end portion 179 having a large area for contact with another layer or an external device and it includes a plurality of curved portions and a plurality of longitudinal portions such that it curves periodically. Each curved portion includes a pair of oblique portions connected to each other to form a chevron and opposite ends of the pair of oblique portions are connected to respective longitudinal portions. The oblique portions of the data lines 171 make an angle of about 45 degrees with the gate lines 121, and the longitudinal portions cross over the gate electrodes 124. A plurality of branches of each data line 171 project toward the gate electrodes 124 to form a plurality of curved source electrodes 173.

Each drain electrode 175 obliquely extends from a linear end portion disposed near a gate electrode 124 to an expanded end portion having a large area for contact with another layer. The linear end portion of the drain electrode 175 is partly enclosed by the source electrodes 173. Each set of a gate electrode 124, a source electrode 173, and a drain electrode 175 along with a projection 154 of a semiconductor stripe 151 form a TFT having a channel formed in the semiconductor projection 154 disposed between the source electrode 173 and the drain electrode 175.

The data lines 171 and the drain electrodes 175 are preferably made of refractory metal such as Cr, Mo, Mo alloy, Ta and Ti. They may also include a lower film (not shown) preferably made of Mo, Mo alloy or Cr and an upper film (not shown) located thereon and preferably made of Al containing metal.

Like the gate lines 121 and the storage electrode lines 131a and 131b, the data lines 171 and the drain electrodes 175 have inclined lateral sides, and the inclination angles thereof range about 30–80 degrees.

The ohmic contacts 161 and 165 are interposed only between the underlying semiconductor stripes 151 and the overlying data lines 171 and the overlying drain electrodes 175 thereon and reduce the contact resistance therebetween. The semiconductor stripes 151 include a plurality of exposed portions, which are not covered with the data lines 171 and the drain electrodes 175, such as portions located between the source electrodes 173 and the drain electrodes 175.

A passivation layer 180 is formed on the data lines 171 and the drain electrodes 175, and exposed portions of the semiconductor stripes 151, which are not covered with the data lines 171 and the drain electrodes 175. The passivation layer 180 is preferably made of low dielectric insulating material such as a-Si:C:O and a-Si:O:F formed by plasma enhanced chemical vapor deposition (PECVD), organic insulator or inorganic insulator such as silicon nitride and silicon oxide. The passivation layer 180 may have a double-layered structure including a lower inorganic film and an upper organic film in order to prevent the channel portions of the semiconductor stripes 151 from being in direct contact with organic material.

The passivation layer 180 has a plurality of contact holes 182 and 185 exposing the end portions 179 of the data lines 171 and the drain electrodes 175, respectively. The passivation layer 180 and the gate insulating layer 140 have a plurality of contact holes 186 and 187 exposing the storage electrode lines 131a and 131b.

A plurality of pixel electrodes 190, a plurality of contact assistants 82, and a plurality of storage overpasses 84, which are preferably made of ITO or IZO, are formed on the passivation layer 180.

The storage overpasses 84 cross over the gate lines 121 and they are connected to a pair of the storage electrode lines 131 through the contact holes 186 and 187 disposed opposite each other with respect to the gate lines 121. Each storage overpass 84 includes a bridge 84b and a pair of expansions 84a disposed at respective ends of the bridge 84b and located on the contact holes 186 and 187. Referring to FIG. 7, each expansion 84a has two edges adjacent to a pixel electrode 190, a longitudinal edge and an oblique edge making an angle of about 135 degrees with the longitudinal edge. It is preferable that the longitudinal edge is longer than the oblique edge.

Each pixel electrode 190 is located substantially in an area enclosed by the data lines 171 and the gate lines 121, and it has four major edges including a pair of transverse major edges extending substantially parallel to the storage electrode lines 131a and 131b and a pair of curved major edges substantially parallel to the data lines 171 such that it also forms a chevron. Each pair of curved major edges include a concave left edge approaching the transverse edges with an acute angle and a convex right edge approaching the transverse edges with an obtuse angle. The left two of four corners of the pixel electrode 190, where the concave left edges and the transverse edges of the pixel electrode 190 are expected to meet, are chamfered since the expansions 84a of the storage overpasses 84 occupy those places. Referring to FIG. 7, the pixel electrode 190 has two minor edges near each of the acute left corners, which include a longitudinal minor edge L1 meeting one of the transverse edges at about a right angle and an oblique minor edge L2 meeting the concave edge at about a right angle. It is preferable that the longitudinal minor edge L1 is longer than the oblique minor edge L2 for stable alignment of the LC molecules 310, which will be described later in detail. In addition, the longitudinal minor edge L1 and the oblique minor edge L2 of the pixel electrode 190 are substantially parallel to the longitudinal edge and the oblique edge of the expansions 84a of the storage overpasses 84.

The pixel electrodes 190 overlap the storage electrode lines 131a and 131b including the storage electrodes 133a and 133b and the expansions of the drain electrodes 175. In particular, the storage electrode lines 131a and 131b overlap the minor edges L1 and L2.

The pixel electrodes 190 are physically and electrically connected to the drain electrodes 175 through the contact holes 185 such that the pixel electrodes 190 receive the data voltages from the drain electrodes 175. The pixel electrodes 190 supplied with the data voltages generate electric fields in cooperation with the common electrode 270, which reorient liquid crystal molecules 310 disposed therebetween.

A pixel electrode 190 and the common electrode 270 form a capacitor called a "liquid crystal capacitor," which stores applied voltages after turn-off of the TFT. An additional capacitor called a "storage capacitor," which is connected in parallel to the liquid crystal capacitor, is provided for enhancing the voltage storing capacity. The storage capacitors are implemented by overlapping the pixel electrodes 190 with the storage electrode lines 131a and 131b including the storage electrodes 133a and 133b.

The pixel electrodes 190 may overlap the data lines 171 to increase aperture ratio. By adapting a low dielectric passivation layer, the increase of the parasitic capacitance between the pixel electrode 190 and the data lines 171 can be compensated.

The contact assistants 82 are connected to the exposed end portions 179 of the data lines 171 through the contact holes 182. The contact assistants 82 protect the exposed end portions 179 and complement the adhesion between the exposed end portions 179 and external devices. The contact assistants 82 may be omitted when the end portions 179 are omitted.

The description of the common electrode panel 200 follows with reference to FIGS. 1–4 and 6.

A light blocking member 220 called a black matrix is formed on an insulating substrate 210 such as transparent glass and it has a plurality of openings facing the pixel electrodes 190. Accordingly, the light blocking member 220 may include a plurality of curved portions facing the curved portions of the data lines 171, a plurality of transverse portions facing the gate lines 121, and a plurality of expanded portions facing the TFTs and the longitudinal portions of the data lines 171. The light blocking member 220 prevents light leakage between the pixel electrodes 190.

A plurality of color filter stripes 230 are formed on the substrate 210 and the light blocking member 220 and each of the color filter stripes 230 is disposed in adjacent two data lines 171. Each of the color filter stripes 230 extends substantially in the longitudinal direction and it has a pair of curved opposite edges disposed on the data lines 171. Adjacent two of the color filter stripes 230 overlap each other to block the light leakage between the pixel electrodes 190, but the edges thereof may exactly match with each other, or may be spaced apart from each other. Each color filter 230 may represent one of three primary colors such as red, green and blue colors. The color filters 230 may be disposed on the TFT array panel 100, and in this case, they may be disposed under the gate insulating layer 140 or under the passivation layer 180.

An overcoat 250 preferably made of silicon nitride or organic material is formed on the color filters 230 and the light blocking member 220. The overcoat 250 protects the color filters 230 and gives a flat top surface.

A common electrode 270 preferably made of transparent conductive material such as ITO and IZO and supplied with the common voltage is formed on the overcoat 250. The common electrode 270 is supplied with the common voltage and it has a plurality of sets of a chevron-like cutout 271. The cutout 271 includes a curved portion 271a having a curve point, a center transverse portion 271b connected to the curve point of the curved portion 271a, and a pair of terminal transverse portions 271c connected to respective ends of the curved portion 271a. The curved portion 271a of the cutout 271 extends substantially parallel to the data lines 171 and it bisects the electrode 190 into left and right halves. The center transverse portion 271b makes an obtuse angle with the curved portion 271a and extends approximately to the convex vertex of the electrode 190. The terminal transverse portions 271c are aligned with transverse edges of the electrode 190, respectively, and they make obtuse angles with the curved portion 271a.

Alignment layers 11 and 21 that may be homeotropic are coated on inner surfaces of the panels 100 and 200.

A polarizer or polarizers (not shown) are provided on outer surfaces of the panels 100 and 200 such that their polarization axes may be crossed and one of the transmissive axes may be parallel to the gate lines 121. One of the polarizers may be omitted when the LCD is a reflective LCD.

The LCD may further include at least one retardation film for compensating the retardation of the LC layer 3.

It is preferable that the LC layer 3 has negative dielectric anisotropy and it is subjected to a vertical alignment that the LC molecules 310 in the LC layer 3 are aligned such that their long axes are substantially vertical to the surfaces of the panels 100 and 200 in absence of electric field.

Upon application of the common voltage to the common electrode 270 and a data voltage to the pixel electrodes 190, a primary electric field substantially perpendicular to the surfaces of the panels 100 and 200 is generated. The LC molecules 310 tend to change their orientations in response to the electric field such that their long axes are perpendicular to the field direction. In the meantime, the cutouts 271 of the common electrode 270 and the edges of the pixel electrodes 190 distort the primary electric field to have a horizontal component which determines the tilt directions of the LC molecules 310. The horizontal component of the primary electric field is perpendicular to the edges of the cutouts 271 of the common electrode 270 and the edges of the pixel electrodes 190.

A pixel region that is defined as a portion of the LC layer 3 disposed on a pixel electrode 190 includes a plurality of sub-regions.

The horizontal component of the primary electric field in the sub-regions is, substantially perpendicular to the extension direction of the curved portions 271a of the cutouts 271 of the common electrode 270 and the curved major edges of the pixel electrode 190 since they are much longer than other edges of the pixel electrode 190. Accordingly, the sub-regions include eight domains, each domain including substantially the same tilt direction, and the domains are partitioned by the edges of the pixel electrode 190, the cutout 271 bisecting the pixel electrode 190, and an imaginary transverse center line connecting the center transverse portions 271b of the cutout 271. The domains have four tilt directions.

At this time, the oblique minor edge L2 of the pixel electrode 190 shown in FIG. 7 may cause a horizontal component at the primary electric field, which makes nearly a right angle with that caused by the curved major edges of the pixel electrode 190, thereby causing texture. Accordingly, it is preferable that the oblique minor edge L2 is as short as possible and the length of the oblique minor edge L2 can be reduced by elongating the longitudinal minor edge L1. In addition, the storage electrode lines 131a and 131b overlap the minor edge L2 to cover the texture caused by the oblique minor edge L2.

In the meantime, the direction of a secondary electric field due to the voltage difference between the pixel electrodes 190 is perpendicular to the edges of the pixel electrodes 190 and the cutouts 271. Accordingly, the field direction of the secondary electric field coincides with that of the horizontal component of the primary electric field in the domains. Consequently, the secondary electric field between the pixel electrodes 190 enhances the determination of the tilt directions of the LC molecules 310 in the domains.

Since the LCD performs inversion such as dot inversion, column inversion, etc., adjacent pixel electrodes 190 are supplied with data voltages having opposite polarity with respect to the common voltage and thus a secondary electric field between the adjacent pixel electrodes 190 is almost always generated to enhance the stability of the domains.

Since the tilt directions of all domains make an angle of about 45 degrees with the gate lines 121, which are parallel to or perpendicular to the edges of the panels 100 and 200, and the 45-degree intersection of the tilt directions and the transmissive axes of the polarizers gives maximum transmittance, the polarizers can be attached such that the transmissive axes of the polarizers are parallel to or perpendicular to the edges of the panels 100 and 200 and it reduces the production cost.

The number, shapes, and arrangements of the cutouts 271 may be modified depending on the design factors. Moreover, the cutouts 271 may be substituted with protrusions and preferably made of organic material.

A TFT array panel for an LCD according to another embodiment of the present invention will be described in detail with reference to FIG. 8.

Figure 8:
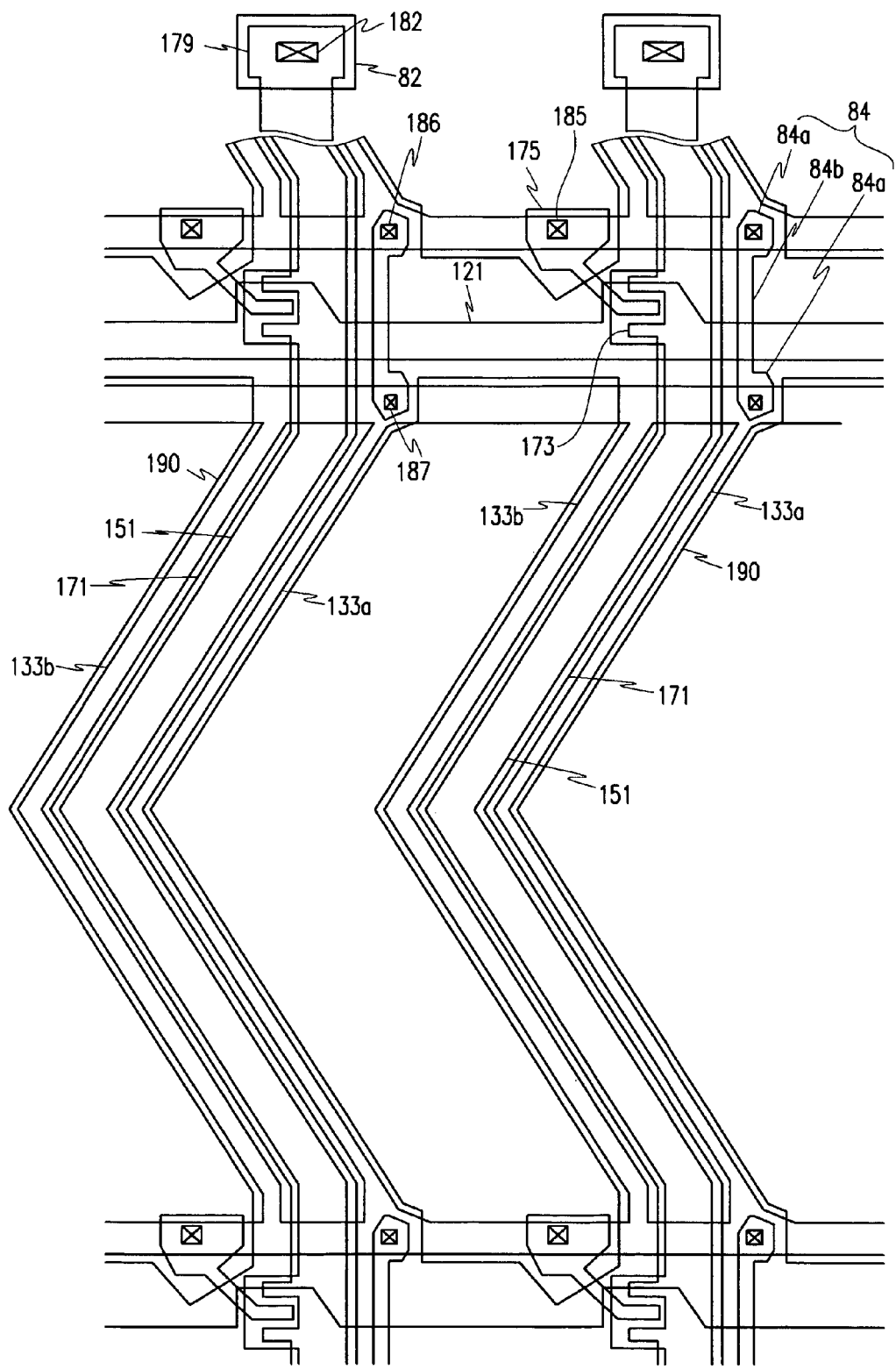
FIG. 8 is a layout view of a TFT array panel for an LCD according to another embodiment of the present invention.

FIG. 8 is a layout view of a TFT array panel for an LCD according to another embodiment of the present invention.

Since a layered structure of the TFT array panel 100 according to this embodiment is almost the same as that shown in FIGS. 2–5, it is not shown.

Referring to FIGS. 2–4 and 8, a plurality of gate lines 121 including a plurality of gate electrodes 124 and a plurality of storage electrode lines 131a and 131b including a plurality of storage electrodes 133a and 133b are formed on a substrate 110, and a gate insulating layer 140, a plurality of semiconductor stripes 151 including a plurality of projections 154, and a plurality of ohmic contact stripes 161 including a plurality of projections 163 and a plurality of ohmic contact islands 165 are sequentially formed thereon. A plurality of data lines 171 including a plurality of source electrodes 173 and a plurality of drain electrodes 175 are formed on the ohmic contacts 161 and 165 and the gate insulating layer 140, and a passivation layer 180 is formed thereon. A plurality of contact holes 182, 185, 186 and 187 are provided at the passivation layer 180 and the gate insulating layer 140. A plurality of pixel electrodes 190, a plurality of storage overpasses 84 including expansions 84a and bridges 84b, and a plurality of contact assistants 82 are formed on the passivation layer 180 and an alignment layer 11 is coated thereon.

Referring to FIG. 8, the convexity of the pixel electrodes 190 is reversed compared with that shown in FIG. 5. Accordingly, the left corners of the pixel electrodes 190, where the overpasses 84 are disposed, are obtuse and minor edges of the pixel electrodes 190 make an obtuse angle such as about 135 degrees with curved edges of the pixel electrodes 190 or they are parallel to the curved edges. Therefore, the overpasses 84 may not disturb the stability of the domains, but they may rather enhance the stability of the domains.

Many of the above-described features of the TFT array panel shown in FIGS. 2–5 may be appropriate to the TFT array panel shown in FIG. 8.

A TFT array panel for an LCD according to another embodiment of the present invention will be described in detail with reference to FIG. 9.

Figure 9:
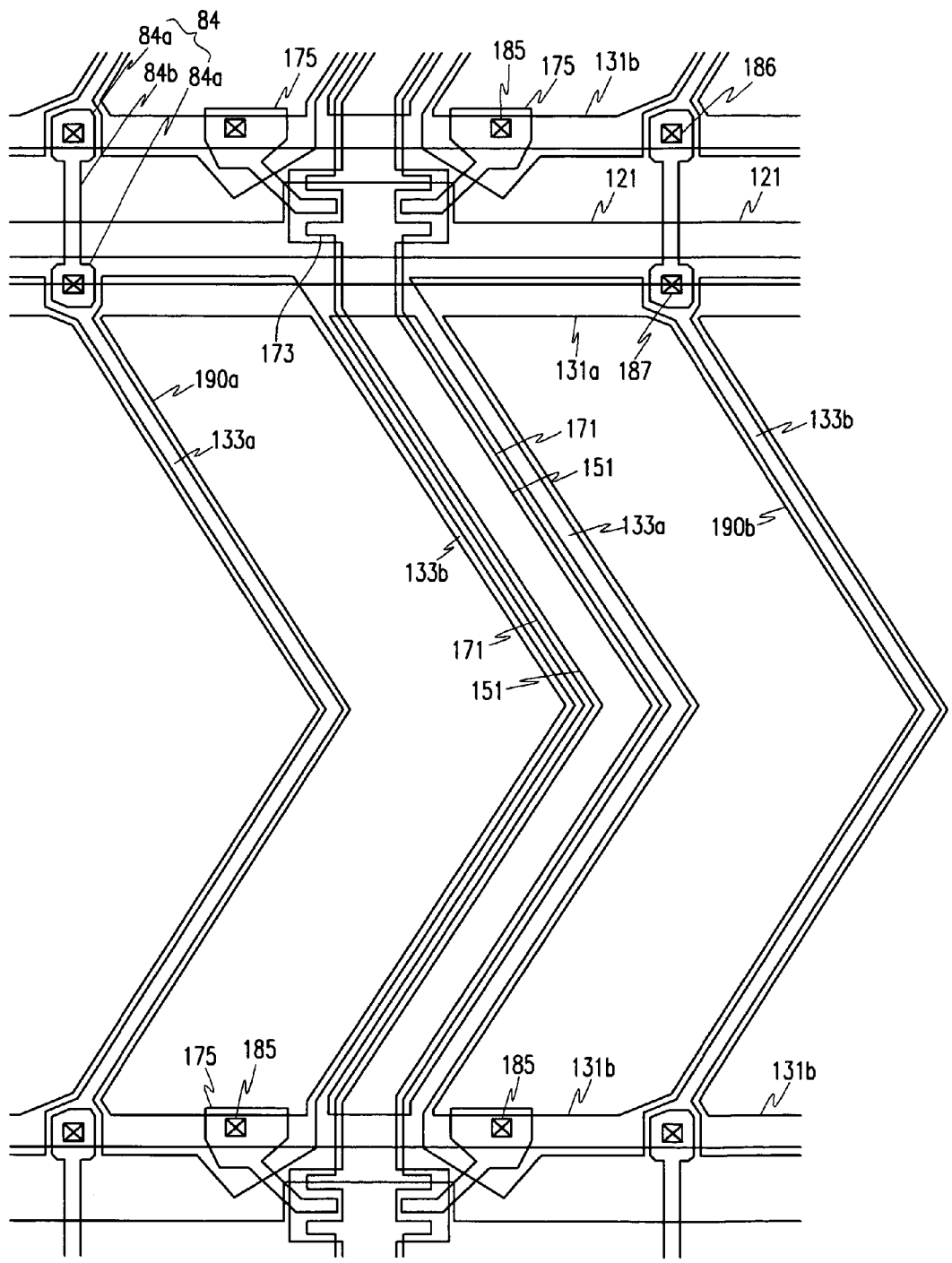
FIG. 9 is a layout view of a TFT array panel for an LCD according to another embodiment of the present invention.

FIG. 9 is a layout view of a TFT array panel for an LCD according to another embodiment of the present invention.

Since a layered structure of the TFT array panel 100 according to this embodiment is almost the same as that shown in FIGS. 2–5 and 8, it is not shown.

Referring to FIGS. 2–4 and 9, a plurality of gate lines 121 including gate electrodes 124 and a plurality of storage electrode lines 131a and 131b including storage electrodes 133a and 133b are formed on a substrate 110, and a gate insulating layer 140, a plurality of semiconductor stripes 151 including projections 154, and a plurality of ohmic contact stripes 161 including projections 163 and a plurality of ohmic contact islands 165 are sequentially formed thereon. A plurality of data lines 171 including source electrodes 173 and a plurality of drain electrodes 175 are formed on the ohmic contacts 161 and 165 and the gate insulating layer 140, and a passivation layer 180 is formed thereon. A plurality of contact holes 182, 185, 186 and 187 are provided at the passivation layer 180 and the gate insulating layer 140. A plurality of pixel electrodes 190, a plurality of storage overpasses 84 including expansions 84a and bridges 84b, and a plurality of contact assistants 82 are formed on the passivation layer 180 and an alignment layer 11 is coated thereon.

Different from the TFT array panel shown in FIGS. 2–5 and 8, the data lines 171 passes through centers of the pixel electrodes 190 and each pixel electrode 190 is divided into left and right half electrodes 190a and 190b with respect to a data line 171. The left and the right halve electrodes 190a and 190b are connected to respective TFTs, but the TFTs are connected to a single gate line and a single data line. The storage electrode 133a and 133b are disposed between overlap curved edges of the left and right half electrodes 190a and 190b. Each of the expansions 84a of the overpasses 84 is disposed simultaneously near an acute corner of a right half electrode 190b of a pixel electrode 190 and an obtuse corner of a left half electrode 190a of an adjacent pixel electrode 190.

Many of the above-described features of the TFT array panel shown in FIGS. 2–5 and 8 may be appropriate to the TFT array panel shown in FIG. 9.

An LCD according to another embodiment of the present invention will be described in detail with reference to FIGS. 10 and 11.

Figure 10:
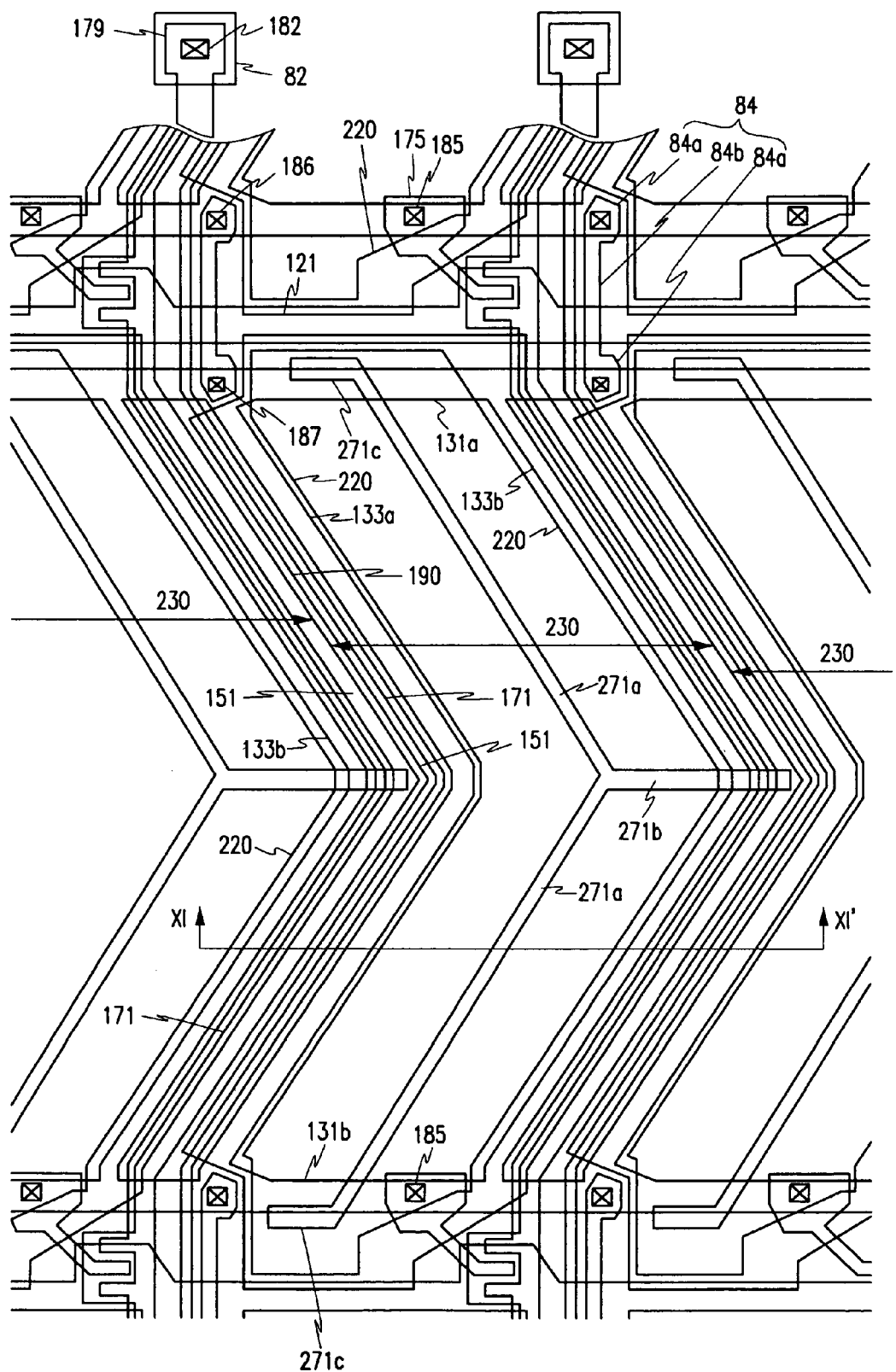
FIG. 10 is a layout view of an LCD according to another embodiment of the present invention.
Figure 11:
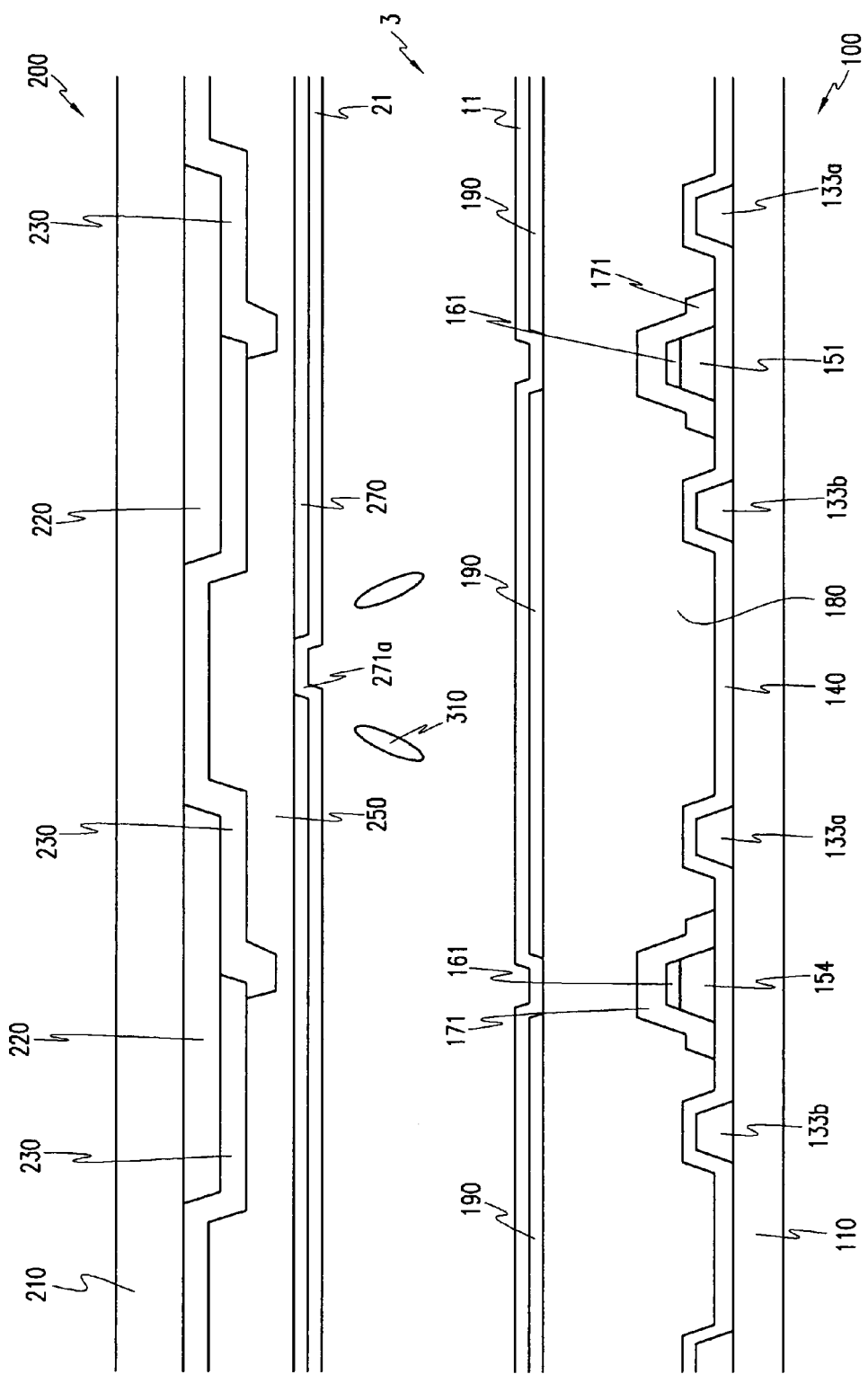
FIG. 11 is a sectional view of the LCD shown in FIG. 10 taken along the line XI–XI'.

FIG. 10 is a layout view of an LCD according to another embodiment of the present invention and FIG. 11 is a sectional view of the LCD shown in FIG. 10 taken along the line XI–XI'.

An LCD according to this embodiment includes a TFT array panel 100, a common electrode panel 200, and a LC layer 3 interposed between the panels 100 and 200 and containing a plurality of LC molecules 310 aligned substantially vertical to surfaces of the panels 100 and 200.

Layered structures of the panels 100 and 200 according to this embodiment are almost the same as those shown in FIGS. 1–6.

Regarding the TFT array panel, a plurality of gate lines 121 including gate electrodes 124 and a plurality of storage electrode lines 131a and 131b including storage electrodes 133a and 133b are formed on a substrate 110, and a gate insulating layer 140, a plurality of semiconductor stripes 151 including projections 154, and a plurality of ohmic contact stripes 161 including projections 163 and a plurality of ohmic contact islands 165 are sequentially formed thereon. A plurality of data lines 171 including source electrodes 173 and a plurality of drain electrodes 175 are formed on the ohmic contacts 161 and 165 and the gate insulating layer 140, and a passivation layer 180 is formed thereon. A plurality of contact holes 182, 185, 186 and 187 are provided at the passivation layer 180 and the gate insulating layer 140. A plurality of pixel electrodes 190, a plurality of storage overpasses 84 including expansions 84a and bridges 84b, and a plurality of contact assistants 82 are formed on the passivation layer 180 and an alignment layer 11 is coated thereon.

Regarding the common electrode panel 200, a light blocking member 220, a plurality of color filters 230, an overcoat 250, a common electrode 270 having a cutout 271a divided, and an alignment layer 21 are formed on an insulating substrate 210.

Different from the LCD shown in FIG. 1–6, the passivation layer 180 is preferably made of organic material having dielectric constant lower than about 4.0. The pixel electrodes 190 overlap the data lines 171 and the passivation layer 180 is thick enough to reduce the parasitic capacitance between the pixel electrodes 190 and the data lines 171 and to have a flat top surface.

Many of the above-described features of the LCD shown in FIGS. 1–6 may be appropriate to the TFT array panel shown in FIGS. 10 and 11.

A TFT array panel of an LCD according to another embodiment of the present invention will be described in detail with reference to FIGS. 12–14.

Figure 12:
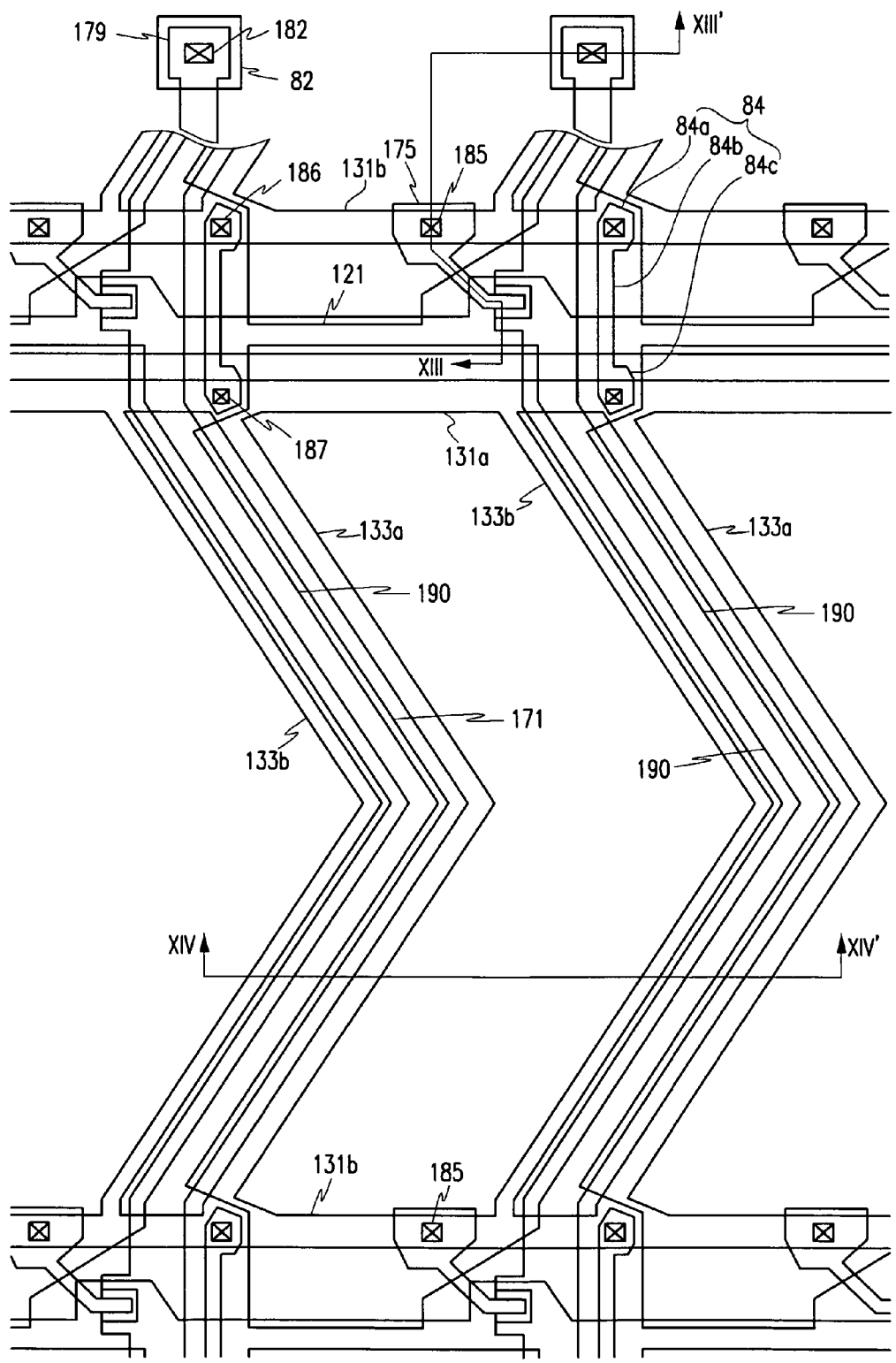
FIG. 12 is a layout view of a TFT array panel of an LCD according to another embodiment of the present invention.
Figure 13:
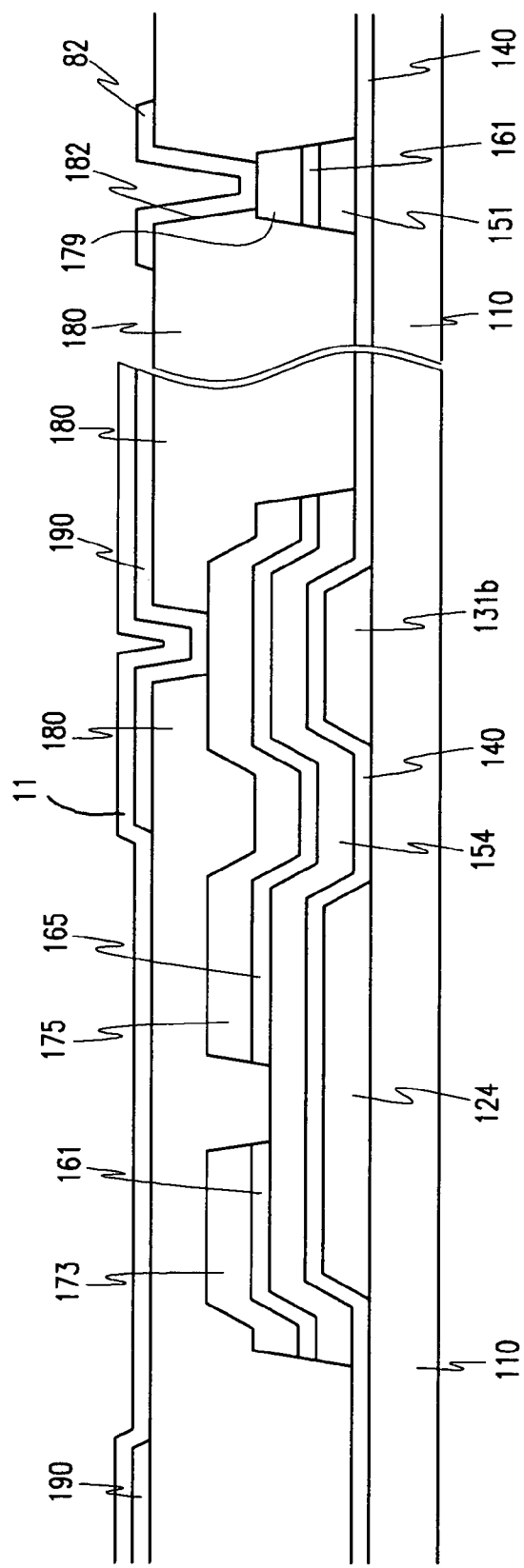
FIG. 13 is a sectional view of the TFT array panel shown in FIG. 12 taken along the line XIII–XIII'.
Figure 14:
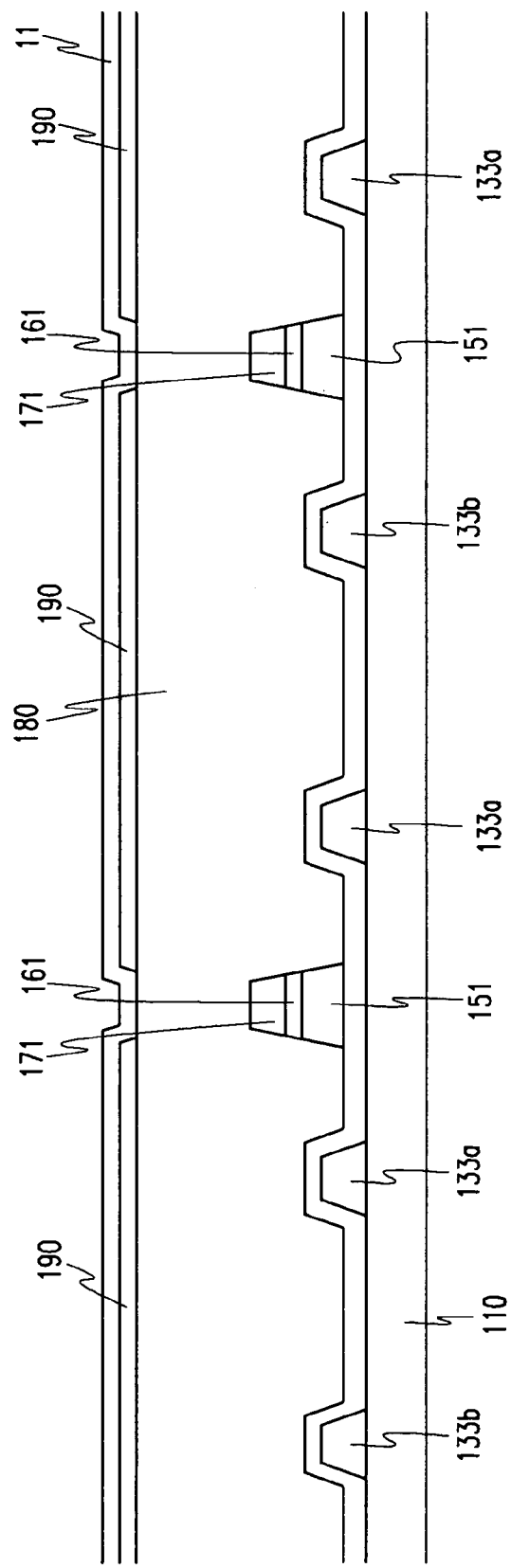
FIG. 14 is a sectional view of the TFT array panel shown in FIG. 12 taken along the lines XIV–XIV'.

FIG. 12 is a layout view of a TFT array panel of an LCD according to another embodiment of the present invention, FIG. 13 is a sectional view of the TFT array panel shown in FIG. 12 taken along the line XIII–XIII', and FIG. 14 is a sectional view of the TFT array panel shown in FIG. 12 taken along the lines XIV–XIV'.

Referring to FIGS. 12–14, a layered structure of the TFT array panel 100 according to this embodiment are almost the same as that shown in FIGS. 10 and 11.

In detail, a plurality of gate lines 121 including a plurality of gate electrodes 124 and a plurality of storage electrode lines 131a and 131b including a plurality of storage electrodes 133a and 133b are formed on a substrate 110, and a gate insulating layer 140, a plurality of semiconductor stripes 151 including a plurality of projections 154, and a plurality of ohmic contact stripes 161 including a plurality of projections 163 and a plurality of ohmic contact islands 165 are sequentially formed thereon. A plurality of data lines 171 including a plurality of source electrodes 173 and a plurality of drain electrodes 175 are formed on the ohmic contacts 161 and 165, and a passivation layer 180 is formed thereon. A plurality of contact holes 182, 185, 186 and 187 are provided at the passivation layer 180 and the gate insulating layer 140. A plurality of pixel electrodes 190, a plurality of storage overpasses 84 including expansions 84a and bridges 84b, and a plurality of contact assistants 82 are formed on the passivation layer 180 and an alignment layer 11 is coated thereon.

Different from the LCD shown in FIGS. 10 and 11, the semiconductor stripes 151 have almost the same planar shapes as the data lines 171 and the drain electrodes 175 as well as the underlying ohmic contacts 161 and 165. However, the projections 154 of the semiconductor stripes 151 include some exposed portions, which are not covered with the data lines 171 and the drain electrodes 175, such as portions located between the source electrodes 173 and the drain electrodes 175.

A manufacturing method of the TFT array panel according to an embodiment simultaneously forms the data lines 171, the drain electrodes 175, the semiconductors. 151, and the ohmic contacts 161 and 165 using one photolithography process.

A photoresist pattern for the photolithography process has position-dependent thickness, and in particular, it has first and second portions with decreased thickness. The first portions are located on wire areas that will be occupied by the data lines 171 and the drain electrodes 175 and the second portions are located on channel areas of TFTs.

The position-dependent thickness of the photoresist is obtained by several techniques, for example, by providing translucent areas on the exposure mask as well as transparent areas and light blocking opaque areas. The translucent areas may have a slit pattern, a lattice pattern, a thin film(s) with intermediate transmittance or intermediate thickness. When using a slit pattern, it is preferable that the width of the slits or the distance between the slits is smaller than the resolution of a light exposer used for the photolithography. Another example is to use reflowable photoresist. In detail, once a photoresist pattern made of a reflowable material is formed by using a normal exposure mask only with transparent areas and opaque areas, it is subject to reflow process to flow onto areas without the photoresist, thereby forming thin portions.

As a result, the manufacturing process is simplified by omitting a photolithography step.

Many of the above-described features of the TFT array panel shown in FIGS. 10 and 11 may be appropriate to the TFT array panel shown in FIGS. 12–14.

An LCD according to another embodiment of the present invention will be described in detail with reference to FIGS. 15 and 16.

Figure 15:
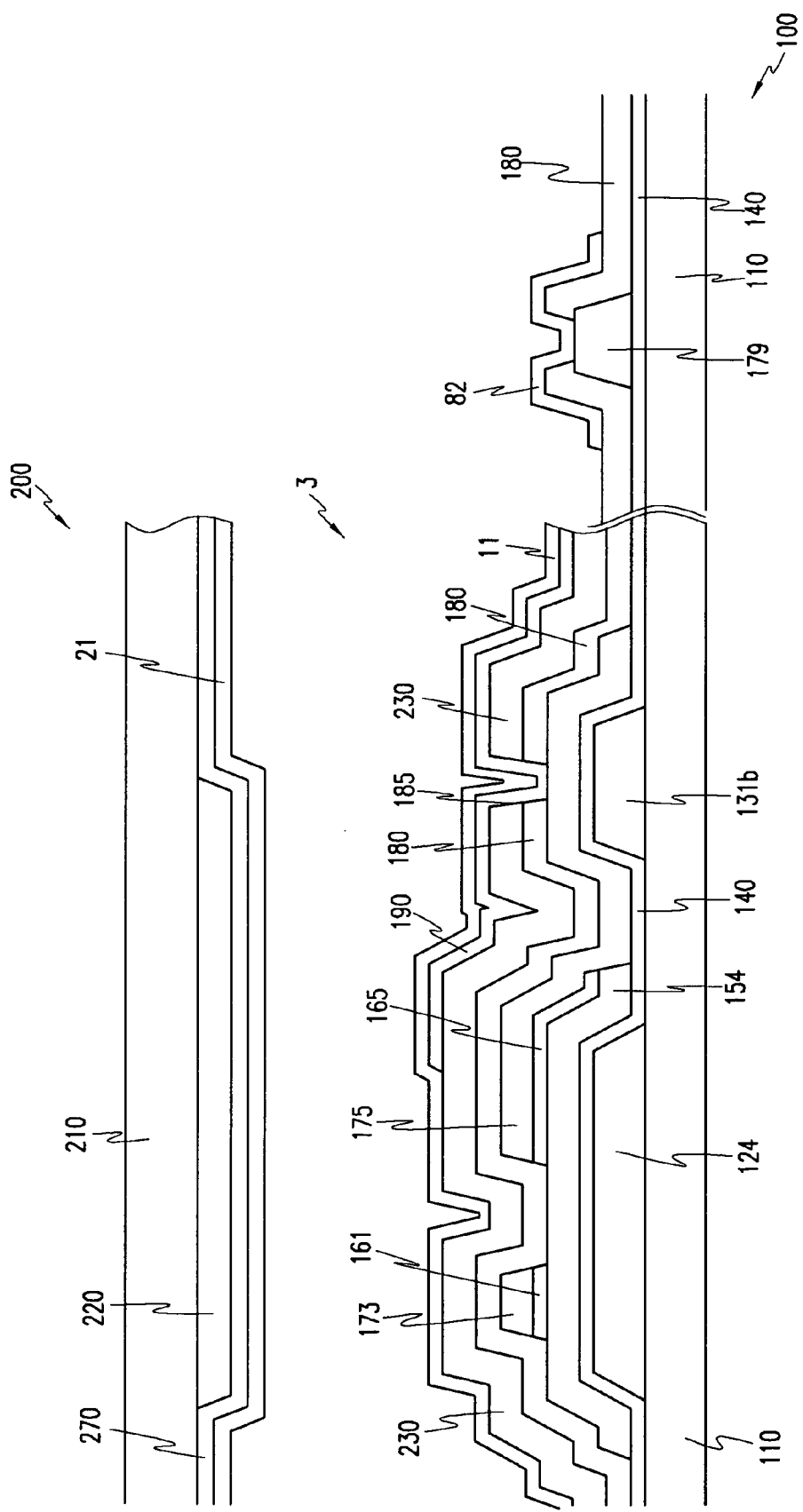
FIGS. 15 and 16 are sectional views of the LCD shown in FIG. 1 taken along the line II–II' and III–III', respectively, according to another embodiment of the present invention.
Figure 16:
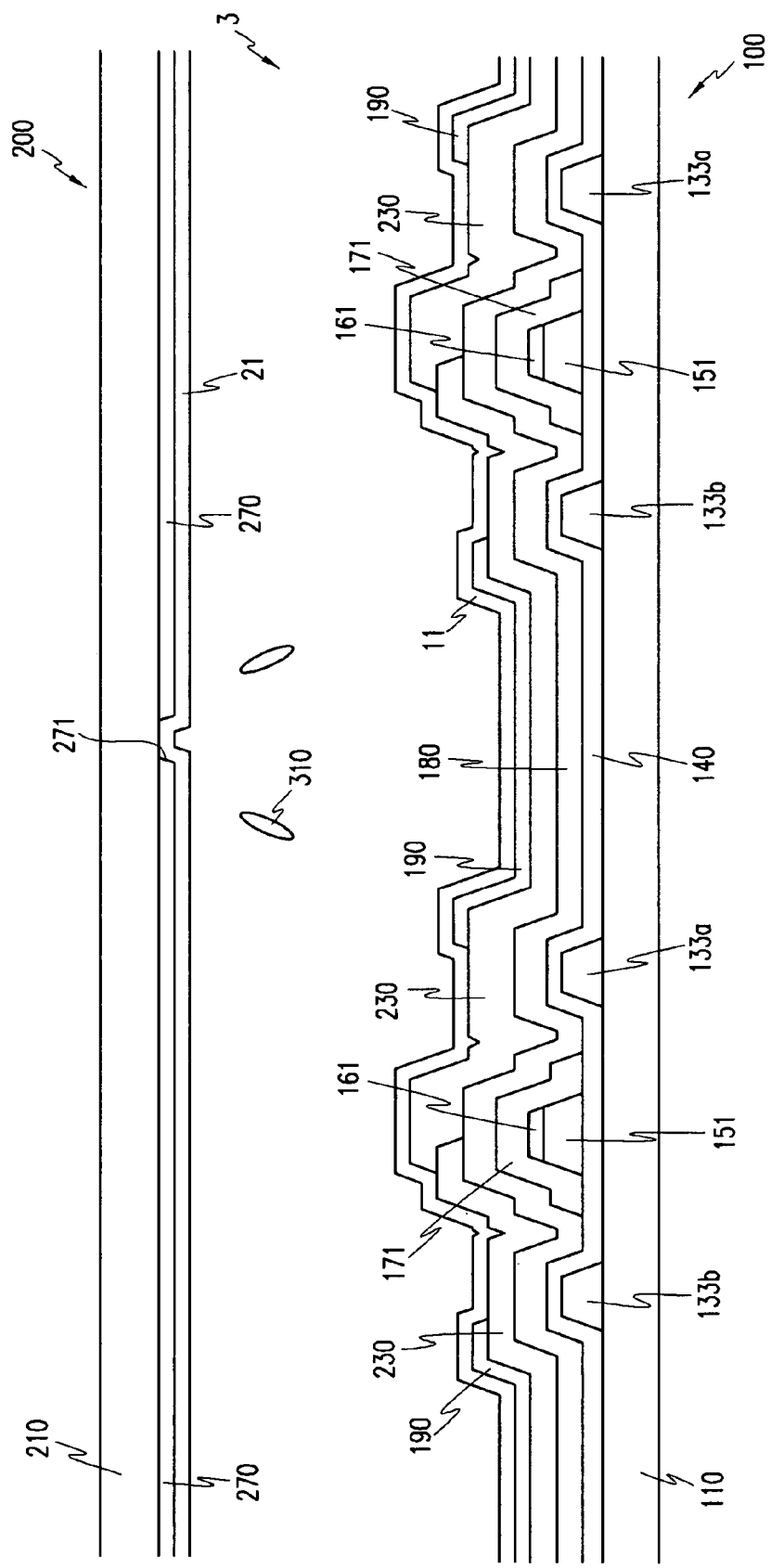

FIGS. 15 and 16 are sectional views of the LCD shown in FIG. 1 taken along the line II–II' and III–III', respectively, according to another embodiment of the present invention.

An LCD according to this embodiment includes a TFT array panel 100, a common electrode panel 200, and a LC layer 3 interposed between the panels 100 and 200 and containing a plurality of LC molecules 310 aligned substantially vertical to surfaces of the panels 100 and 200.

Layered structures of the panels 100 and 200 according to this embodiment are almost the same as those shown in FIGS. 1–6.

Regarding the TFT array panel, a plurality of gate lines 121 including gate electrodes 124 and a plurality of storage electrode lines 131a and 131b including storage electrodes 133a and 133b are formed on a substrate 110, and a gate insulating layer 140, a plurality of semiconductor stripes 151 including projections 154, and a plurality of ohmic contact stripes 161 including projections 163 and a plurality of ohmic contact islands 165 are sequentially formed thereon. A plurality of data lines 171 including source electrodes 173 and a plurality of drain electrodes 175 are formed on the ohmic contacts 161 and 165 and the gate insulating layer 140, and a passivation layer 180 is formed thereon. A plurality of contact holes 182, 185, 186 and 187 are provided at the passivation layer 180 and the gate insulating layer 140. A plurality of pixel electrodes 190, a plurality of storage overpasses 84 including expansions 84a and bridges 84b, and a plurality of contact assistants 82 are formed on the passivation layer 180 and an alignment layer 11 is coated thereon.

Regarding the common electrode panel 200, a light blocking member 220, a common electrode 270 having a cutout 271a, and an alignment layer 21 are formed on an insulating substrate 210.

Different from the LCD shown in FIG. 1-6, a plurality of color filters 230 are formed on the passivation layer 180. Each of the color filters 230 may be disposed substantially between adjacent two the data lines 171 and may extend in a longitudinal direction along the pixel electrodes 190 such that it is periodically curved. The color filters 230 are not disposed on a peripheral area which is provided with end portions 179 of the data lines 171, and the contact holes 185 also penetrate the color filters 230. Adjacent color filters 230 overlap each other on the data lines 171 to block the light leakage between the pixel electrodes 190 and the light blocking member 220 may be disposed only on TFTs and optionally on the gate lines 121.

The LCD may further include an insulating layer disposed between the color filters 230 and the pixel electrodes 190 for preventing pigments in the color filters 230 from contaminating the pixel electrodes 190 and the liquid crystal layer 3 and for protecting the color filters 230.

Many of the above-described features of the LCD shown in FIGS. 1–6 may be appropriate to the TFT array panel shown in FIGS. 15 and 16.

While the present invention has been described in detail with reference to the preferred embodiments, those skilled in the art will appreciate that various modifications and substitutions can be made thereto without departing from the spirit and scope of the present invention as set forth in the appended claims.

What is claimed is:

1. A thin film transistor array panel, comprising:
   a substrate;
   a gate line formed on the substrate;
   first and second storage electrodes formed on the substrate and disposed opposite each other with respect to the gate line;
   a gate insulating layer formed in the gate line and the first and the second storage electrodes;
   a curved data line formed on the gate insulating layer;
   a thin film transistor connected to the gate line and the data line;
   a passivation layer formed on the data line and the thin film transistor;
   a pixel electrode formed on the passivation layer, connected to the thin film transistor, and having an acute corner and an obtuse corner; and
   an overpass crossing over the gate line and connected to the first and the second storage electrodes.

2. The thin film transistor array panel of claim 1, wherein the pixel electrode comprises the same layer as the overpass.

3. The thin film transistor array panel of claim 2, wherein the overpass is disposed near the acute corner and the acute corner of the pixel electrode is chamfered.

4. The thin film transistor array panel of claim 3, wherein the pixel electrode has a first major edge and a second major edge shorter than the first major edge and the first and the second major edges approach near the acute corner.

5. The thin film transistor array panel of claim 4, wherein the acute corner of the pixel electrode includes a first minor edge perpendicular to the first major edge and a second minor edge oblique to the first major edge.

6. The thin film transistor array panel of claim 5, wherein the first minor edge is shorter than the second minor edge.

7. The thin film transistor array panel of claim 6, wherein the first minor edge and the second minor edge are connected to each other to make a concave vertex.

8. The thin film transistor array panel of claim 5, wherein the overpass has first and second edges substantially parallel to the first and the second minor edges, respectively.

9. The thin film transistor array panel of claim 5, wherein the pixel electrode has a cutout.

10. The thin film transistor array panel of claim 5, wherein the first major edge of the pixel electrode is substantially parallel to the data line.

11. The thin film transistor array panel of claim 5, wherein the data line overlaps the pixel electrode.

12. The thin film transistor array panel of claim 11, wherein the passivation layer comprises organic insulator.

13. The thin film transistor array panel of claim 2, wherein the overpass is disposed near the obtuse corner of the pixel electrode.

* * * * *